United States Patent
Bull

Patent Number: 5,339,852
Date of Patent: Aug. 23, 1994

[54] PERMANENT PORTABLE WEATHERPROOF BLIND

[76] Inventor: Danny C. Bull, Box 329, Elhorn, Nebr. 68022

[21] Appl. No.: 973,969

[22] Filed: Nov. 6, 1992

[51] Int. Cl.$^5$ .................................. E04H 15/00
[52] U.S. Cl. .................................. 135/87; 27/16; 49/40; 296/37.6; 296/164; 135/102; 135/901; 43/1
[58] Field of Search ............ 135/102, 112, 117, 87, 135/900, 901, 903, 89; 43/1, 2; 296/164, 167, 37.6; 27/16, 18; 52/79.4; 114/351, 353; 49/40, 41, 39, 376

[56] References Cited

U.S. PATENT DOCUMENTS

| | | | |
|---|---|---|---|
| 1,156,738 | 10/1915 | Anderson | 49/40 |
| 2,816,297 | 12/1957 | Stanley | 9/5 |
| 2,827,729 | 3/1958 | Hoene | 43/1 |
| 2,992,503 | 7/1961 | Webb | 43/1 |
| 3,052,054 | 9/1962 | Litteton | 43/1 |
| 3,399,922 | 9/1968 | Burton | 135/102 |
| 3,545,056 | 12/1967 | Schevenell | 27/16 |
| 3,719,244 | 3/1973 | Miller et al. | 296/164 |
| 3,724,323 | 4/1973 | Selle | 49/40 |
| 3,787,912 | 1/1974 | Huey, Jr. | 43/1 |
| 3,936,969 | 2/1976 | Richard | 43/1 |
| 4,282,689 | 8/1981 | Royer | 49/40 |
| 4,360,953 | 11/1982 | Angermann | 27/18 |
| 4,364,193 | 12/1982 | Visco | 43/1 |
| 4,782,616 | 11/1988 | Hambleton | 43/1 |
| 4,794,717 | 1/1989 | Horsmann | 43/1 |
| 4,892,346 | 1/1990 | Berlin | 296/37.6 |
| 5,102,179 | 4/1992 | Royer | 296/26 |
| 5,171,059 | 12/1992 | Patrick | 135/901 |

*Primary Examiner*—Carl D. Friedman
*Assistant Examiner*—Winnie Yip
*Attorney, Agent, or Firm*—John A. Beehner

[57] ABSTRACT

A permanent weatherproof blind adapted for use in a variety of hunting or observing situations includes a generally cylindrical, substantially rigid shell sized to resemble a bale of hay. The shell consists of an upper section having a curved outer wall substantially conforming to a cylindrical shape and a lower section adapted to fit within and be supported by a bed of a standard pickup truck. The shell further consists of side walls on both of the upper and lower sections and front and rear walls on the lower section. Included in the curved outer wall of the upper section are one or more game sighting and shooting openings. These openings are covered by movably mounted covers which provide protection for the interior of the blind. Plastic or fiberglass may be used to form the shell.

7 Claims, 3 Drawing Sheets

PERMANENT PORTABLE WEATHERPROOF BLIND

BACKGROUND OF THE INVENTION

1. Technical Field

This invention relates to hunting blind structures and, more particularly, to a portable hunting blind structure having a generally cylindrical, substantially rigid shell sized to resemble a bale of hay, the shell having one or more game-sighting and shooting openings formed in the outer wall of the rigid shell.

2. Description of the Prior Art

For nature watchers and hunters, it is important to be able to enter the natural habitat of an animal without alarming the animal to be photographed, viewed or hunted. The prior art presents various solutions to this problem, among them Horsmann, U.S. Pat. No. 4,794,717, which discloses a portable hunting blind structure arranged to resemble a bale of hay. Horsmann, however, being constructed of tenting material or a similar readily collapsible material, cannot provide sufficient weather resistance to allow the blind to be left out in the environment for a substantial period of time.

Stanley, U.S. Pat. No. 2,816,297, discloses a portable duck blind which has some resemblance to a bale of hay when erected, but which, again, is formed by netting draped over a tent-like frame. Thus the same structural problems relating to Horsmann relate to Stanley.

In addition to these patents discussed, many other examples of blinds exist in the prior art, though none provide a substantially rigid blind structure which can house a plurality of hunters therein, the blind sized to resemble a bale of hay.

Therefore, an object of the present invention is to provide an improved permanent portable weatherproof blind.

Another object of the present invention is to provide a permanent portable weatherproof blind sized to resemble a bale of hay.

Another object of the present invention is to provide a permanent weatherproof blind designed for support and transport on the bed of a standard pickup truck so that the blind can be easily transported to, from and between hunting sites.

Still another object of the present invention is to provide a permanent portable weatherproof blind which may be left out in a field or other such hunting area for prolonged periods of time while incurring minimal damage.

Yet another object of the present invention is to provide a permanent portable weatherproof blind which may serve as shelter for a plurality of hunters.

Still another object of the present invention is to provide a permanent portable weatherproof blind having a semi-cylindrical opening formed in the curved outer surface of the invention and a semi-cylindrical pivoting hatch door for covering the semi-cylindrical opening.

Yet another object of the present invention is to provide a permanent portable weatherproof blind which may be used as storage for decoys, guns, sleeping bags and other such hunting or camping equipment, as the blind of the present invention may be closed and locked against intruders.

Finally, an object of the present invention is to provide a permanent portable weatherproof blind which is simple to manufacture, durable in construction and safe in use.

SUMMARY OF THE INVENTION

The present invention provides a permanent portable weatherproof blind consisting of a generally cylindrical, substantially rigid shell sized to resemble a bale of hay. The shell consists of an upper section having a curved outer wall substantially conforming to a cylindrical shape and a lower section adapted to fit within and be supported by the bed of a standard pickup truck. The shell further consists of sidewalls on both of the upper and lower sections and front and rear walls on the lower section. Formed in the curved outer wall of the upper section are one or more game-sighting and shooting openings, each having a movably mounted cover for closing and opening the game-sighting and shooting opening.

The game-sighting and shooting opening formed in the curved outer wall may be a semi-cylindrical opening, and the movably mounted cover may be a semi-cylindrical pivotal hatch door which may be opened to permit those inside to shoot out or to leave and those outside to enter, or closed to prevent wind, rain, snow or other elements from entering the interior of the weatherproof blind.

As thus described, the present invention provides substantial advantages over the prior art as the present invention is not only windproof but also waterproof. Also, as the present invention is constructed of a substantially rigid material, occupants of the blind may receive a higher degree of protection from the elements. The present invention is also much more durable than many of the blinds found in the prior art, again, owing to the rigid material of which it is constructed. This blind thus has the structural features and advantages normally associated only with permanent nonmovable blinds, yet it is easily transported on the bed of a pickup truck to, from and between any sites best suited for the season and game being hunted. Finally, the present invention may be used for storage of many different items even when it is not hunting season, thus increasing its usefulness. Further advantages of the present invention will be seen in light of the following description.

DESCRIPTION OF THE PREFERRED EMBODIMENT

Figure 1:
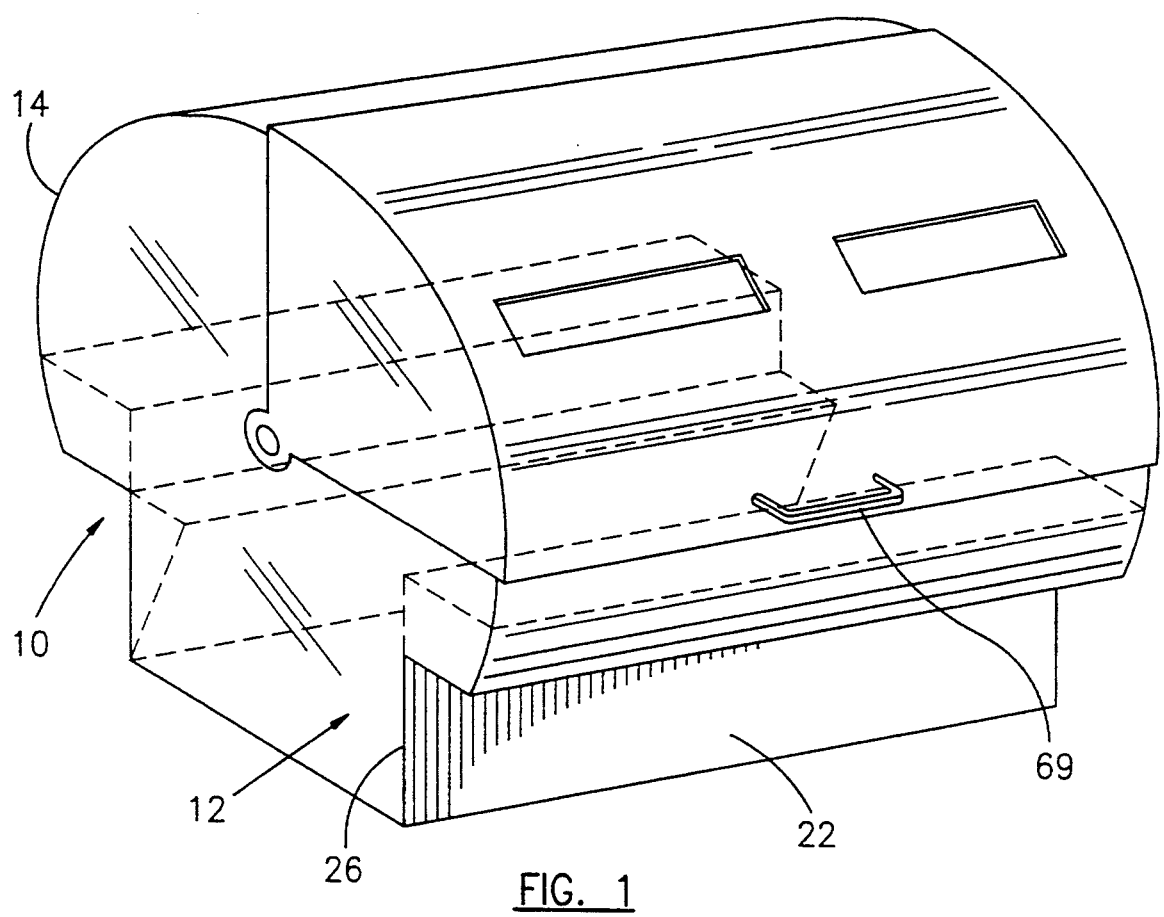
FIG. 1 is a perspective view of the permanent portable weatherproof blind of the invention.
Figure 2:
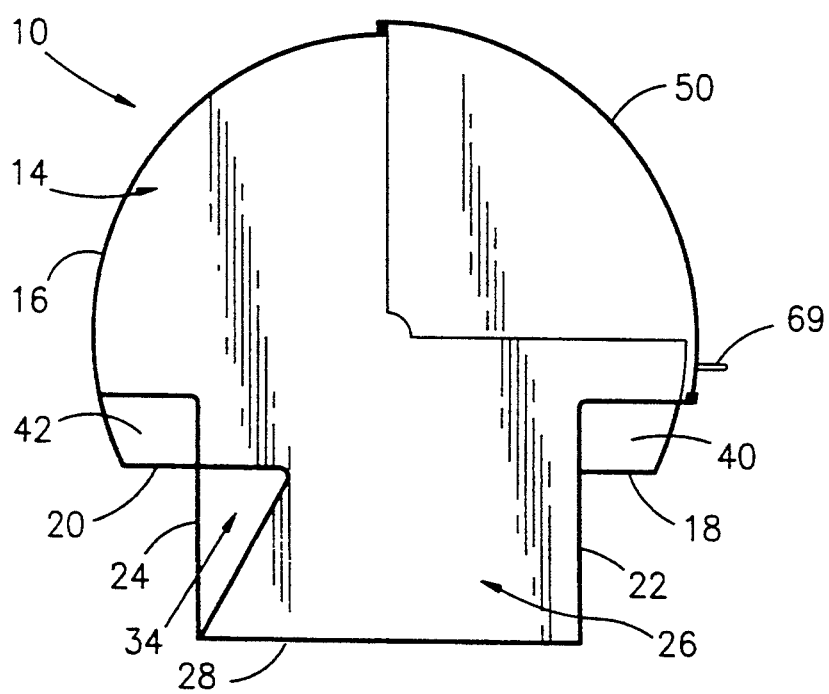
FIG. 2 is a side sectional view of the blind of the present invention.

The permanent portable weatherproof blind 10 is shown in its preferred embodiment in FIGS. 1 and 2 as including a generally cylindrical, substantially rigid shell 12. The shell 12 is preferably formed and sized to resemble a bale of hay. The shell 12 further includes an upper section 14 having a curved outer wall 16. The curved outer wall 16 substantially conforms to a cylindrical shape and in a preferred embodiment would have a diameter of between 5 and 8 feet and a length of between 7 and 10 feet. The curved outer wall 16 of the upper section 14 extends downwards at the front and rear of the weatherproof blind 10 to approximately 1 to 3 feet above the ground. The lower edges of the curved outer wall 16 are respectfully connected to front and rear horizontal sections 18 and 20, each having a width between 6 and 12 inches and a length equal to the length of the upper section 14.

Each of the front and rear horizontal sections 18 and 20 are respectively connected to the front and rear walls 22 and 24 of the box-like lower section 26.

The rectangular box-like lower section 26 preferably includes the front and rear walls 22 and 24 and a floor section 28 extending between and connected to the lower edges of each of the front and rear walls 22 and 24. Side walls 30 and 32 complete the box-like shape of the lower section 26 by closing off the open ends of the channel formed by the floor section 28 and front and rear walls 22 and 24.

Figure 7:
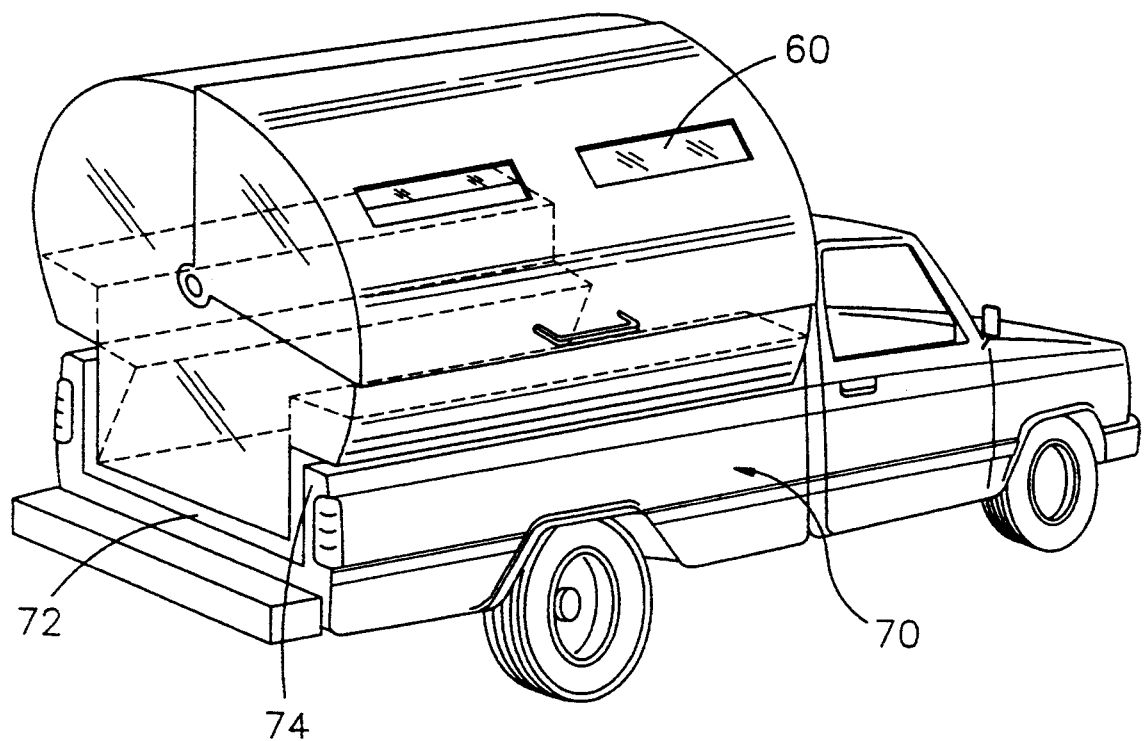
FIG. 7 is a perspective view of the permanent portable weatherproof blind placed on a pickup truck.

It is preferred that the lower section 26 have a length equal to the length of the upper section 14 and a width no greater than 4 feet such that the blind of the present invention may fit within and be supported by the bed 72 of a standard pickup truck 70, as shown in FIG. 7. To this end, the height of the lower section must be greater than the height of a side wall 74 of the bed 72 of a pickup truck 70 to allow the blind 10 to fit within the bed 72.

Formed in the interior of the lower section 26 is a seat 34 preferably formed of a horizontally extending bench section 36, extending inward from the top edge of the rear wall 24 toward the center of the lower section 26. For supporting the bench section 36, one or more struts 38 may be provided extending between the inner edge of the bench section 36 and the corner formed by the floor section 28 and rear wall 24. Alternatively, the struts 38 may be replaced by a wall section similar to that used for the rear wall 24 of the lower section 26.

Positioned atop each of the front and rear horizontal sections 18 and 20 are storage boxes 40 and 42. Front storage box 40 may be open-topped to provide convenient access to shells, cameras or the like. Rear storage box 42 may be provided with a removable lid to store various forms of camping or hunting gear as desired by the occupant of the permanent portable weatherproof blind 10.

For completing the enclosure of the interior of the blind 10, a pair of opposite upper section side walls 44 and 46 are provided to seal the opposite open ends of the upper section 14. As shown in FIGS. 1 and 2, the left and right side walls 44 and 46 are generally semi-circular in shape and are designed to engage opposite edges of the curved outer wall and the upper edge of each of the left and right side walls 30 and 32, thus forming a watertight and windproof seal.

Figure 4:
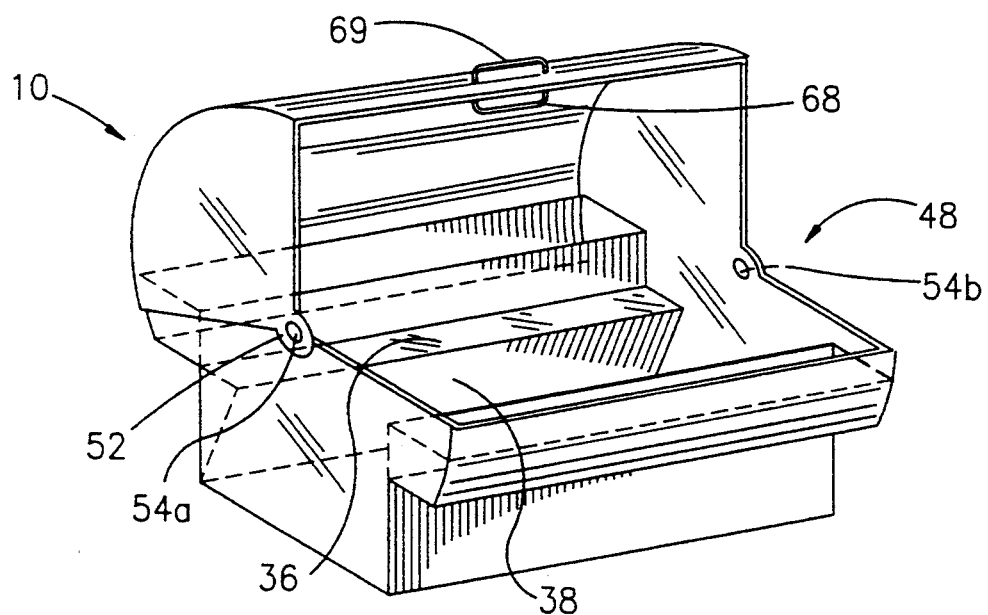
FIG. 4 is a perspective view of the blind showing the hatch door open exhibiting the interior of the blind.

Formed in the upper section 14 of the blind 10 is a semi-cylindrical opening 48 shown best in FIGS. 2 and 4. The semi-cylindrical opening 48 is preferably formed extending through 90° to 150° of arc, thus providing an ideal open area from which to shoot at game. For covering the semi-cylindrical opening 48, a semi-cylindrical pivoting hatch door 50 is provided. The hatch door 50 is preferably constructed similar to the section removed from the upper section 14 to form the semi-cylindrical opening 48, however, the radius of the pivoting hatch door 50 is slightly larger than the radius of the curved outer wall 16 whereby the pivoting hatch door 50 may freely pivot about the central longitudinal axis 52 of the upper section 14. A pair of pivot pins 54a and 54b may be provided to attach the pivoting hatch door 50 to the upper section 14 at the center longitudinal axis 52.

Figure 3:
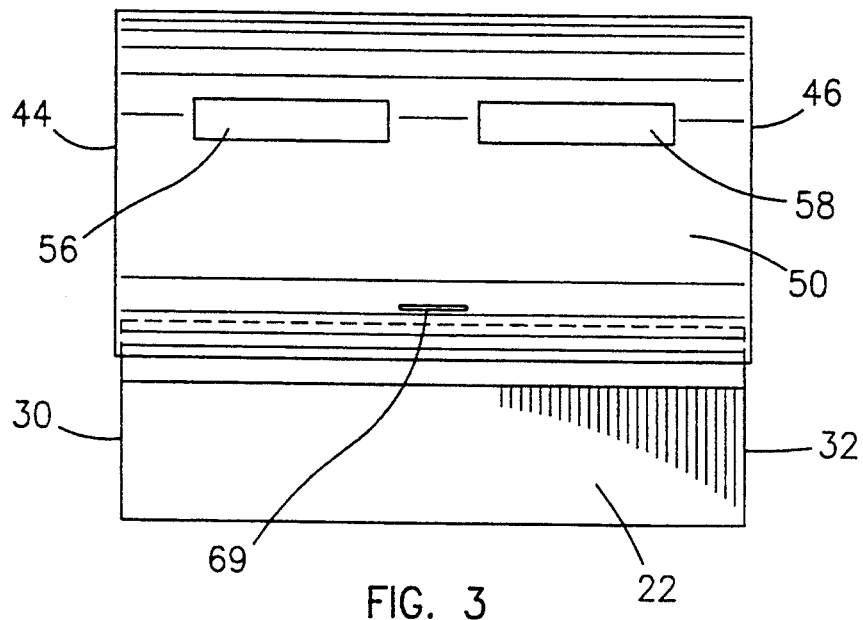
FIG. 3 is a front elevational view of the permanent portable weatherproof blind.

To allow occupants of the weatherproof blind 10 to see out of the blind when the hatch door 50 is closed, one or more viewing slots 56 and 58 may be formed in the pivoting hatch door 50, as shown in FIG. 3. To cover the viewing slots 56 and 58, a sliding door mechanism 60, as shown in FIG. 7, or canvas screen may be used. Whatever means is used to cover the viewing slots, however, the material must not be reflective, as such material might alert game to the presence of hunters. It is also important that the viewing slots 56 and 58 be able to be covered to prevent rain and/or snow from entering the interior of the weatherproof blind 10.

Figure 5:
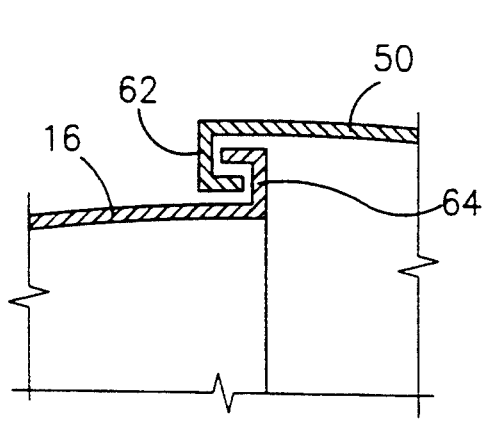
FIG. 5 is a partial detail view showing the top edge of the door and top edge of the semi-cylindrical section exhibiting the interlocking J-channels which act to keep water out of the interior of the blind.

For keeping water out of the interior of the blind, a pair of interlocking J-channels 62 and 64, as shown in FIG. 5, may be used on the top and vertical side edges of the hatch door 50 and semi-cylindrical opening 48. When the hatch door 50 is in closed position, thus covering the semi-cylindrical opening 48, the J-channels 62 and 64 engage one another, thus preventing water from entering the interior of the weatherproof blind 10. The J-channels 62 and 64 may only be positioned on the top and vertical side edges of the hatch door 50 and semi-cylindrical opening 48, as otherwise the J-channels 62 and 64 would interfere with opening and closing of the hatch door 50.

Figure 6:
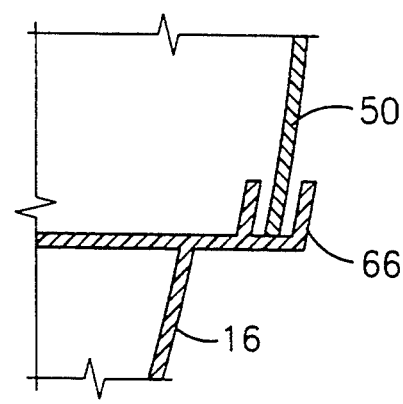
FIG. 6 is a partial detail view of the lower edge of the semi-cylindrical section showing the rain gutter thereon.

For draining water away from the lower edge of the hatch door 50, a rain gutter 66 is preferably formed on the lower and horizontal side edges of the semi-cylindrical opening 48, as shown in FIG. 6. Water flowing down the surface of the pivoting hatch door 50 would thus be drained away from the lower edge of the semi-cylindrical opening, thus preventing the moisture from entering the interior of the weatherproof blind 10.

It is preferred that the pivoting hatch door 50 have interior and exterior handles 68 and 69 which would allow a person outside of the blind 10 or inside of the blind 10 to pivot the hatch door 50. Also, the hatch door 50 may be spring biased to open, having a latch which secures the hatch door 50 in place. In this manner, a hunter may simply flip the latch releasing the hatch door 50 which would open automatically, leaving both of the hunter's hands free to operate the rifle or camera.

It is preferred that the weatherproof blind 10 of the present invention be constructed of a molded plastic or fiberglass which would provide the desired rigidity and durability for the blind. It is contemplated that each of the pieces desired for formation of the blind 10 could be formed from a molded piece of plastic or fiberglass, the process for which would be understood by one skilled in the art.

Figure 8:
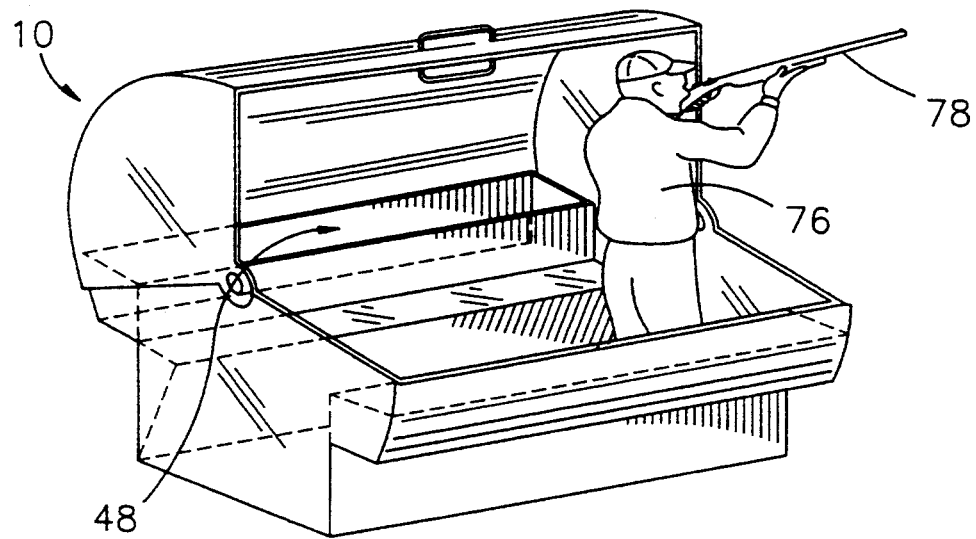
FIG. 8 is a perspective view of the permanent portable weatherproof blind of the present invention in a natural setting showing a hunter standing and shooting from within.

The thus described weatherproof blind 10 of the present invention provides a substantial improvement over blinds found in the prior art. The present invention is immune to rot or damage in all but the most violent of weather events, and thus may be left unprotected for extended periods of time. Moreover, hunters who use the present invention will greatly appreciate the increased comfort and safety provided by the present invention. Additionally, the large size of the semi-cylindrical opening 48 provides a wide-open area for shooting game by a hunter 76 with shotgun 78, as shown in FIG. 8. As contemplated by the dimensions of the present invention, the average hunter will be able to stand fully erect and fire his or her weapon, a feature not found in much of the prior art.

It is to be understood that the above description is not intended in any way to limit the scope of the present invention, which shall follow from the claims set forth below.

There has thus been set forth and described an invention which accomplishes at least all of the stated objectives.

I claim:

1. A permanent portable weatherproof blind comprising;
   generally cylindrical, substantially rigid shell sized to resemble a bale of hay;
   said shell comprising an upper section having a curved outer wall including lower edges, said curved outer wall substantially conforming to a cylindrical shape and a lower section adapted to fit within and be supported by the bed of a standard pickup truck;
   said shell further comprising the side walls on both said upper and lower sections and front and rear walls each having a top edge, on said lower section;
   at least one game sighting and shooting opening formed in said curved outer wall of said upper section;
   movably mounted means for covering said game sighting and shooting openings;
   said lower section further comprising a rectangular open-topped box having a bottom section and forwardly and rearwardly extending substantially horizontal front and rear connecting walls, said front connecting wall extending between and connected to the top edge of said front wall and said lower edge of said curved outer wall and said rear connecting wall extending between and connected to the top edge of said rear wall and the adjacent lower edge of said curved outer wall;
   said game sighting and shooting opening further comprising a generally quarter-cylindrical section removed from said curved outer wall such that a generally quarter-cylindrical opening having lower edges is formed in said upper section; and
   said movably mounted means for covering said game sighting and shooting openings further comprising a generally quarter-cylindrical pivoting hatch door having top and vertical side edges, said hatch door pivoting about an axis collinear with the center longitudinal axis of said upper section whereby said generally quarter-cylindrical opening may be covered.

2. The permanent portable weatherproof blind of claim 1 wherein said rigid shell is colored to resemble a bale of hay.

3. The permanent portable weatherproof blind of claim 1 further comprising at least one storage box mounted on at least one of said front and rear connecting walls for storage of shells, guns, jackets and other hunting gear.

4. The permanent portable weatherproof blind of claim 1 wherein said hatch door further comprises at least one sighting slot formed in said hatch door, each of said sighting slots having means for covering said slot whereby rain, snow and wind may be kept out of said blind.

5. The permanent portable weatherproof blind of claim 1 wherein said hatch door and said upper section of said shell further comprise interlocking J-channels formed on the top and vertical side edges of said hatch door and on the adjacent edges of said generally quarter-cylindrical opening whereby rain, snow and wind may be kept out of the interior of said blind.

6. The permanent portable weatherproof blind of claim 5 wherein said upper section of said shell further comprises rain gutters formed adjacent the lower edges of said generally quarter-cylindrical opening whereby water may be directed away from the interior of said blind.

7. A permanent portable weatherproof blind comprising;
   a generally cylindrical, substantially rigid shell sized to resemble a bale of hay;
   said shell comprising an upper section having a curved outer wall including lower edges, said curved outer wall substantially conforming to a cylindrical shape and a lower section adapted to fit within and be supported by the bed of a standard pickup truck;
   said shell further comprising side walls on both said upper and lower sections and front and rear walls each having a top edge on said lower section;
   at least one game sighting and shooting opening formed in said curved outer wall of said upper section;
   movably mounted means for covering said game sighting and shooting openings;
   said lower section further comprising a rectangular open-topped box having a bottom section and forwardly and rearwardly extending substantially horizontal front and rear connecting walls, said front connecting wall extending between and connected to the top edge of said front wall and said lower edge of said curved outer wall and said rear connecting wall extending between and connected to the top edge of said rear wall and the adjacent lower edge of said curved outer wall;
   said game sighting and shooting opening further comprising a generally quarter-cylindrical section removed from said curved outer wall whereby a generally quarter-cylindrical opening is formed in said upper section;
   said movably mounted means for covering said game sighting and shooting openings further comprising a generally quarter-cylindrical pivoting hatch door having top and vertical side edges, said hatch door pivoting about an axis collinear with the center longitudinal axis of said upper section whereby said generally quarter-cylindrical opening may be covered;
   said hatch door further comprising at least one sighting slot formed in said hatch door, each of said sighting slots having means for covering said slot whereby rain, snow and wind may be kept out of said blind;

said hatch door and said upper section of said shell further comprising interlocking J-channels formed on the top and vertical side edges of said hatch door and on the adjacent edges of said generally quarter-cylindrical opening whereby rain, snow and wind may be kept out of the interior of said blind; and said upper section of said shell further comprising rain gutters formed adjacent the lower edges of said generally quarter-cylindrical opening whereby water may be directed away from the interior of said blind.

* * * * *